United States Patent
Shultz (10) Patent No.: US 6,729,580 B2
(45) Date of Patent: *May 4, 2004

(54) METHOD AND SYSTEM FOR DIRECTING AN OBJECT USING GYROSCOPES

(75) Inventor: Douglas E. Shultz, Brea, CA (US)

(73) Assignee: Northrop Grumman Corporation, Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/828,639

(22) Filed: Apr. 5, 2001

(65) Prior Publication Data

US 2002/0145077 A1 Oct. 10, 2002

(51) Int. Cl.[7] ................................................ B64C 17/06
(52) U.S. Cl. ........................................................ 244/79
(58) Field of Search ............................ 244/79, 62, 165, 244/164; 74/5.22, 5.34

(56) References Cited

U.S. PATENT DOCUMENTS

| | | | |
|---|---|---|---|
| 2,158,180 A | * | 5/1939 | Goddard |
| 2,493,015 A | * | 1/1950 | Newton |
| 2,591,697 A | * | 4/1952 | Hays |
| 2,811,043 A | * | 10/1957 | Bonnell |
| 3,003,356 A | * | 10/1961 | Nordsieck |
| 3,143,892 A | | 8/1964 | Chapman .................. 74/5.34 |
| 3,158,340 A | * | 11/1964 | Sellers |
| 3,452,948 A | | 7/1969 | Kukel et al. .................. 244/1 |
| 3,456,512 A | | 7/1969 | Schmidt ..................... 74/5.34 |
| 3,456,513 A | * | 7/1969 | Emerson |
| 3,493,194 A | | 2/1970 | Kurzhals ...................... 244/1 |
| 3,741,500 A | * | 6/1973 | Liden |
| 3,795,150 A | * | 3/1974 | Eckhardt |
| 3,941,001 A | * | 3/1976 | LaSarge |
| 4,052,654 A | * | 10/1977 | Kramer et al. |
| 4,387,513 A | | 6/1983 | Cowdin ...................... 33/322 |
| 4,573,651 A | | 3/1986 | Stanton ..................... 244/165 |
| 4,608,874 A | | 9/1986 | Audren ...................... 74/5.41 |
| 5,259,571 A | | 11/1993 | Blazquez .................. 244/12.2 |
| 5,437,420 A | * | 8/1995 | Rosen |
| 5,628,267 A | | 5/1997 | Hoshio et al. ............. 114/122 |
| 5,931,421 A | | 8/1999 | Surauer et al. ............ 244/165 |
| 6,131,056 A | * | 10/2000 | Bailey et al. |
| 6,305,647 B1 | * | 10/2001 | Defendini et al. |

FOREIGN PATENT DOCUMENTS

| | | | | |
|---|---|---|---|---|
| DE | 3523160 | * | 1/1987 | ............ 244/62 |
| GB | 1173564 | * | 10/1969 | ............ 244/79 |
| WO | 99/47420 | | 9/1999 | ......... B64G/1/28 |

* cited by examiner

*Primary Examiner*—Tien Dinh
(74) *Attorney, Agent, or Firm*—Baker Botts L.L.P.

(57) ABSTRACT

A system for directing an object is disclosed. The system includes a first gyroscope with a first rotating rotor and a second gyroscope with a second rotating rotor. Each gyroscope has a motor that rotates a first gimbal coupled to the rotor and a brake that decreases the rotation of a second gimbal coupled to the first gimbal. The first gyroscope and the second gyroscope generate a torque.

33 Claims, 6 Drawing Sheets

METHOD AND SYSTEM FOR DIRECTING AN OBJECT USING GYROSCOPES

TECHNICAL FIELD OF THE INVENTION

This invention relates generally to the field of mechanics and more specifically to a method and system for directing an object.

BACKGROUND OF THE INVENTION

A variety of objects require direction control. The objects range from large vehicles such as aircraft and spacecraft to small devices such a cameras and medical probes. The objects typically need to be directed in different types of medium, for example, an aircraft moves in air, and a submarine moves in water.

Directing an object, however, poses several challenges. Some direction control mechanisms such as rudders need to be attached to an outside surface of an object. As an object moves in a medium, however, external attachments may inhibit the motion of the object or may disturb the medium. For example, external attachments may create drag on an aircraft, or may cause a submarine to be more detectable to enemy sonar. Moreover, some control systems use thrust or propellants to direct an object. Thrust and propellants, however, also disturb the medium in which an object is moving. Other control systems fail to provide continuous direction control without the use of additional direction control features, which typically require added energy usage. For example, some spacecraft systems require momentum dumping through the use of reactor jets. Consequently, designing a system for directing for an object has posed challenges for many types of objects.

SUMMARY OF THE INVENTION

While known approaches have provided improvements over prior approaches, the challenges in the field of mechanics have continued to increase with demands for more and better techniques having greater effectiveness. Therefore, a need has arisen for a method and system for directing an object.

In accordance with the present invention, a method and system for directing an object are provided that substantially eliminate or reduce the disadvantages and problems associated with previously developed systems and methods.

According to one embodiment of the present invention, a system for directing an object is disclosed. The system includes a first gyroscope with a first rotating rotor and a second gyroscope with a second rotating rotor. The second gyroscope is coupled to the first gyroscope. Each gyroscope has a motor that rotates a first gimbal coupled to the rotor and a brake that decreases the rotation of a second gimbal coupled to the first gimbal. The first gyroscope and the second gyroscope generate a torque.

According to another embodiment of the present invention, a method for directing an object is disclosed. A first rotor of a first gyroscope and a second rotor of a second gyroscope are rotated. The first gyroscope is coupled to the second gyroscope. A first gimbal of each gyroscope is rotated. The rotation of a second gimbal of each gyroscope is decreased, where the second gimbal is coupled to the first gimbal. A torque is generated from the rotation of the first rotor and the second rotor. An object is directed using the torque.

According to another embodiment of the present invention, a system for directing an object is disclosed. The system includes a first pair of gyroscopes that generates a first torque and a second pair of gyroscopes that generates a second torque. A processor is coupled to the first pair of gyroscopes and the second pair of gyroscopes. The processor determines a state of the first pair of gyroscopes and the second pair of gyroscopes, adjusts the first pair of gyroscopes and the second pair of gyroscopes in response to the state, and directs an object using alternately the first torque and the second torque.

According to another embodiment of the present invention, a method for directing an object is disclosed. A first torque is generated using a first pair of gyroscopes. A second torque is generated using a second pair of gyroscopes. A state of the first pair of gyroscopes and the second pair of gyroscopes is determined. The first pair of gyroscopes and the second pair of gyroscopes are adjusted in response to the state. An object is directed using alternately the first torque and the second torque.

Embodiments of the invention may provide numerous technical advantages. The technical advantage of one embodiment is that the system uses gyroscopes located within an object to direct the object in a medium. The need for external apparatus, thrust, or propellants is reduced or eliminated in directing the object, which allows the object to be directed in a controlled manner in the medium while reducing or eliminating disturbances. Another technical advantage of one embodiment is that the system produces continuous direction control, thus reducing the need for additional directing features that may be needed for systems that only provide intermittent direction control.

Other technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
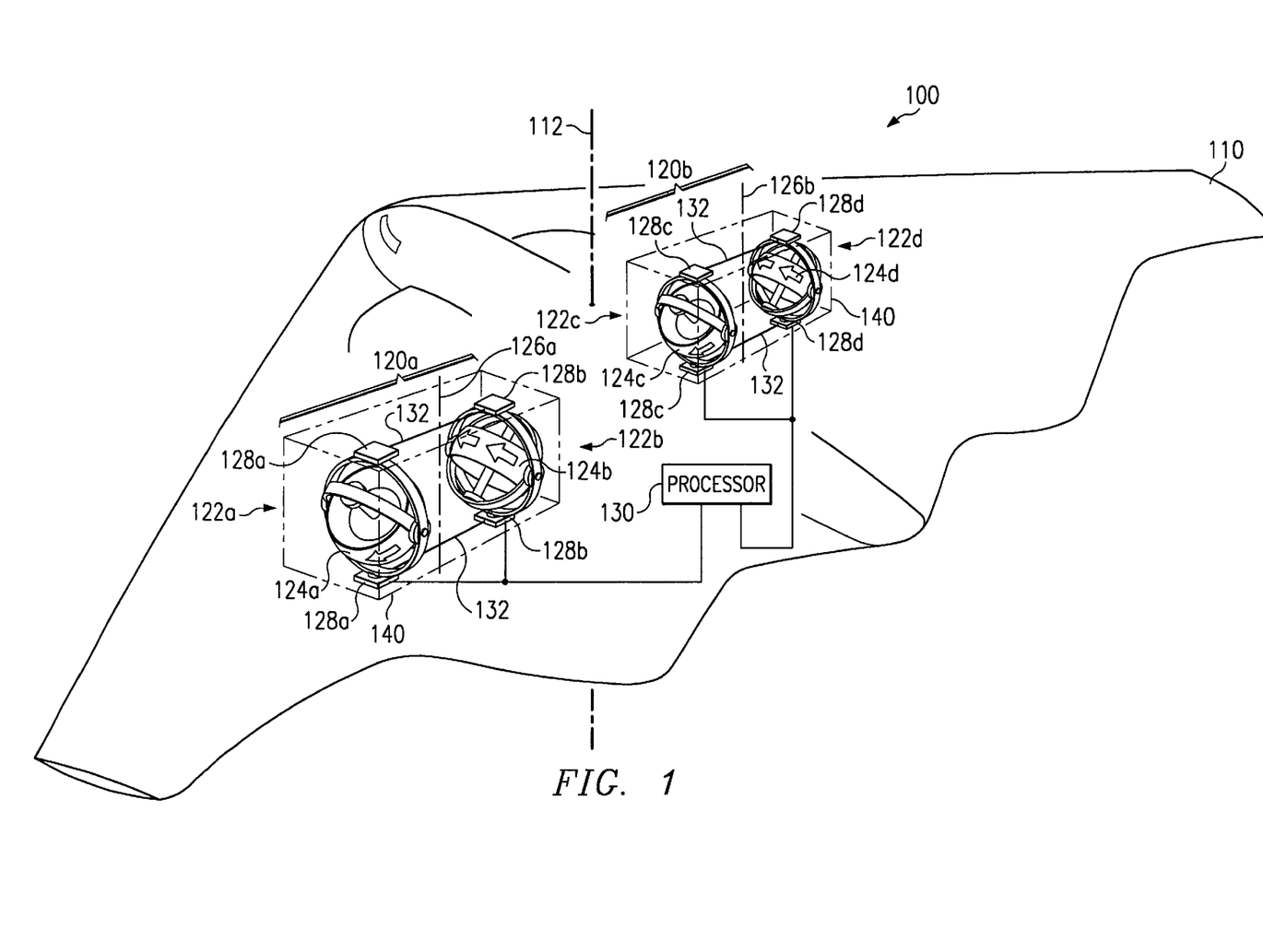
FIG. 1 illustrates one embodiment of a system for directing an object according to the present invention.

FIG. 1 illustrates one embodiment of a system 100 for directing an object 110 such as an aircraft. Object 110 may include, for example, a vehicle that may be directed in a medium, such as a submarine in water. Object 110 may also include, a vehicle that may be directed in space, such as a space craft. Object 110, however, may include any object that may be directed, for example, a device that requires direction control such as a drill head, a camera, or a probe. System 100 may direct object 110 about a control axis 112, for example, the yaw axis or other axis of an aircraft or other object. System 100 may also include suitable configurations that direct object 110 about multiple control axes 112 or in any other direction.

System 100 includes pairs 120a and 120b of gyroscopes 122 coupled together. In each pair 120, gyroscopes 122 are coupled together by couplings 132 coupled to bases 128, which are in turn coupled to object 110. Gyroscopes 122, however, may be configured in any suitable manner, for example, bases 128 may be coupled to object 110 without a coupling between bases 128. "Each" refers to each member of a set or each member of a subset of the set. Gyroscopes 122 of a pair 120 may or may not be at the same location in object 110. For example, gyroscope 122a may be located in the fore of object 110, and gyroscope 122b may be located in the aft of object 110.

Figure 2A:
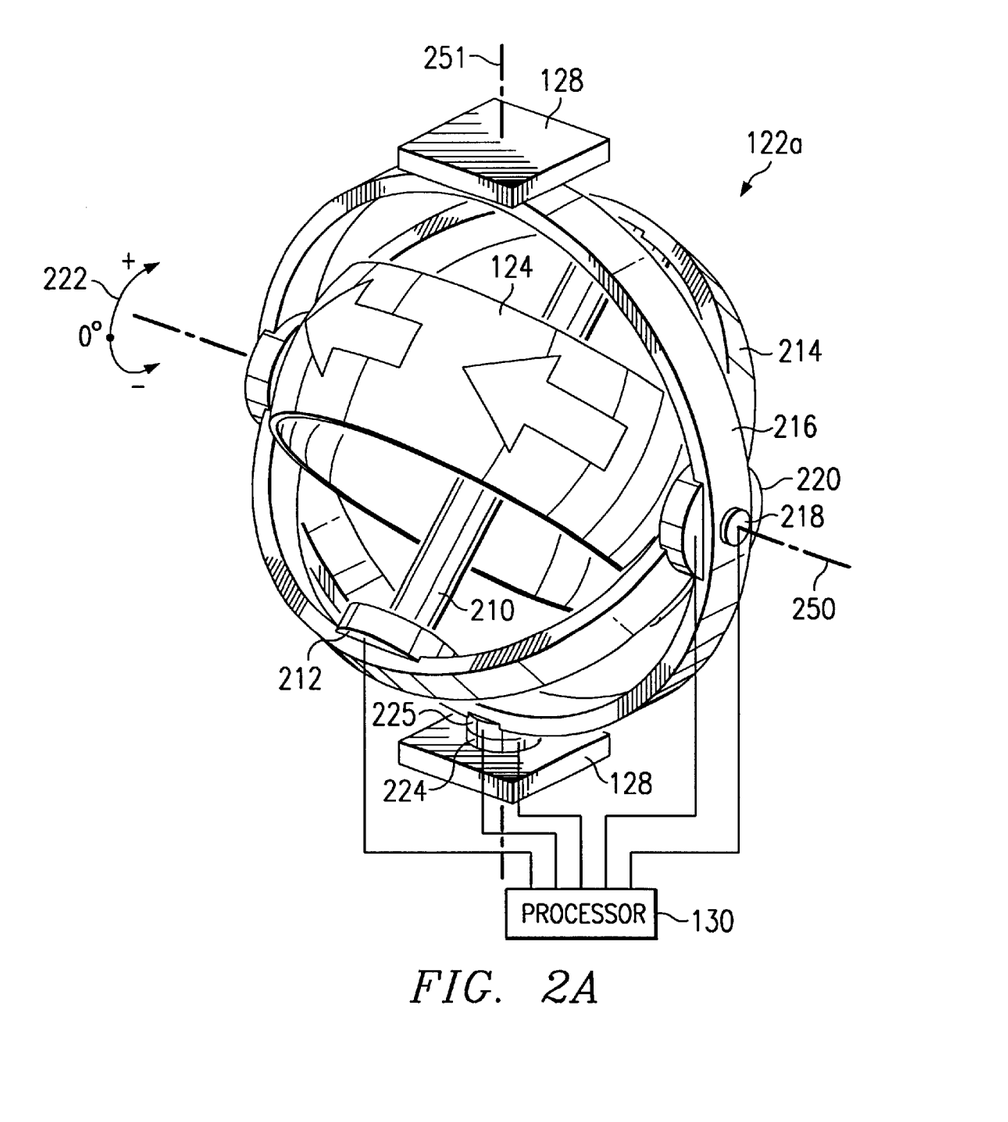
FIG. 2A illustrates one embodiment of a gyroscope with two degrees of freedom that may be used in the system of FIG. 1.

Gyroscopes 122, which are described in more detail in conjunction with FIG. 2, include rotors 124 that rotate. Each pair 120 may be placed in a vacuum vessel 140, which may improve the rotating efficiency of rotors 124 of gyroscopes 122. Alternatively, each gyroscope 122 may be placed in its own vacuum vessel. The rotation of rotors 124 generates a torque about a central axis 126 of each pair 120.

A processor 130 coordinates the generation of torque from each pair 120 and from each gyroscope 122 in order to direct object 110 in a desired direction. For example, processor 130 initiates the generation of torque from pair 120a. As the torque from pair 120a decreases, processor 130 initiates the generation of torque from pair 120b.

System 100 directs object 110 using gyroscopes 122, reducing or eliminating the use of external apparatus, external thrust, or propellants, which in turn reduces disturbance to the medium through which object 110 is moving. Moreover, processor 130 coordinates the gyroscopes 122 in order to produce continuous direction control of object 110.

FIG. 2A illustrates one embodiment of a gyroscope 122a with two degrees of freedom that may be used in system 100 of FIG. 1. Any suitable embodiment of gyroscope 122, however, may be used in system 100, depending upon the application, for example, the type of object 110 and/or the direction control requirements of object 110.

In one embodiment, object 110 includes an aircraft weighing approximately 20,000 pounds and with a wingspan of approximately 45 feet. Each gyroscope 122a of system 100 includes rotor 124 that comprises, for example, carbon fiber. Rotor 124 may weigh, for example, approximately less than one percent of the weight of object 110, for example, approximately 80 pounds. The diameter of rotor 124 may be, for example, approximately less than five percent of the wingspan of object 110, for example, approximately 16 to 20 inches. Rotor 124 rotates about an axle 210. For the given size and weight of rotor 124, rotor may rotate at approximately 40,000 rotations per minute. Rotors of other suitable sizes and weights may be used with other rotation speeds. For example, a smaller and lighter rotor 124 may be used with a higher rotation speed.

A motor 218 controls the rotation of inner gimbal 214 within outer gimbal 216. Motor 218 may include, for example, a high-torque motor. Other suitable motors, however, may be used, for example, a gear-head motor or a linear actuator suitably coupled to gimbal 214 to provide a moment. A sensor 220 detects the motion and position of inner gimbal 214, for example, the angle of rotation of inner gimbal 214 with respect to a plane defined to be 0° that is substantially orthogonal to the plane of outer gimbal 216, where the positive and negative directions are as shown by arrows 222. Bases 128 couple outer gimbal 216 to object 110. Outer gimbal 216 rotates about an axis 251 defined approximately by the points where outer gimbal 216 is coupled to bases 128. The rotation of outer gimbal 216 represents a second degree of freedom.

A motor 218 controls the rotation of inner gimbal 214 within outer gimbal 216. Motor 218 may include, for example, a high-torque motor. Other suitable motors, however, may be used, for example, a gear-head motor or a linear actuator suitably coupled to gimbal 214 to provide a moment. A sensor 220 detects the motion and position of inner gimbal 214, for example, the angle of rotation of inner gimbal 214 with respect to a plane defined to be 0° that is substantially orthogonal to the plane of outer gimbal 316, where the positive and negative directions are as shown by arrows 222. Bases 128 couple outer gimbal 216 to object 110. Outer gimbal 216 rotates about an axis 251 defined approximately by the points where outer gimbal 216 is coupled to bases 128. The rotation of outer gimbal 216 represents a second degree of freedom.

A brake 224 decreases or stops the rotation of outer gimbal 216. Brake 224 may include, for example, a disc brake or a dog clutch brake. Other suitable devices for decreasing the rotation of outer gimbal 216, however, may be used, for example, a motor may be used to decrease the rotation. A motor 225 controls the rotation of outer gimbal 216. Motor 225 may align gyroscopes 122a and 122b of a pair 120 such that rotor 124 of gyroscope 122a is rotating in a direction approximately opposite to the rotation of rotor 124 of gyroscope 122b. Motor 225 may be substantially similar to motor 218.

A processor 130 controls the motion of motors 212 and 218 and brake 224. Processor 130 also receives information about the position of gyroscope 122 from sensor 220 and adjusts the motion of gyroscope 122 by sending signals to motor 218 and brake 224. For example, when sensor 220 detects that inner gimbal 214 is at a predetermined angle of rotation such as approximately +45°, processor 130 sends a signal to brake 224 to stop the rotation of outer gimbal 216. When inner gimbal 214 is at another predetermined angle of rotation, such as approximately −45°, processor 130 sends a signal to brake 224 to release outer gimbal 216 to allow it to rotate. Predetermined angles may be any suitable angle between −90° and +90°. Gyroscope 122a may be coupled to a similarly constructed gyroscope 122b with two degrees of freedom. Processor 130 controls the motion of gyroscopes 122a and 122b to generate a torque about axes 250 and 251 in order to direct object 110 about control axis 112.

Figure 2B:
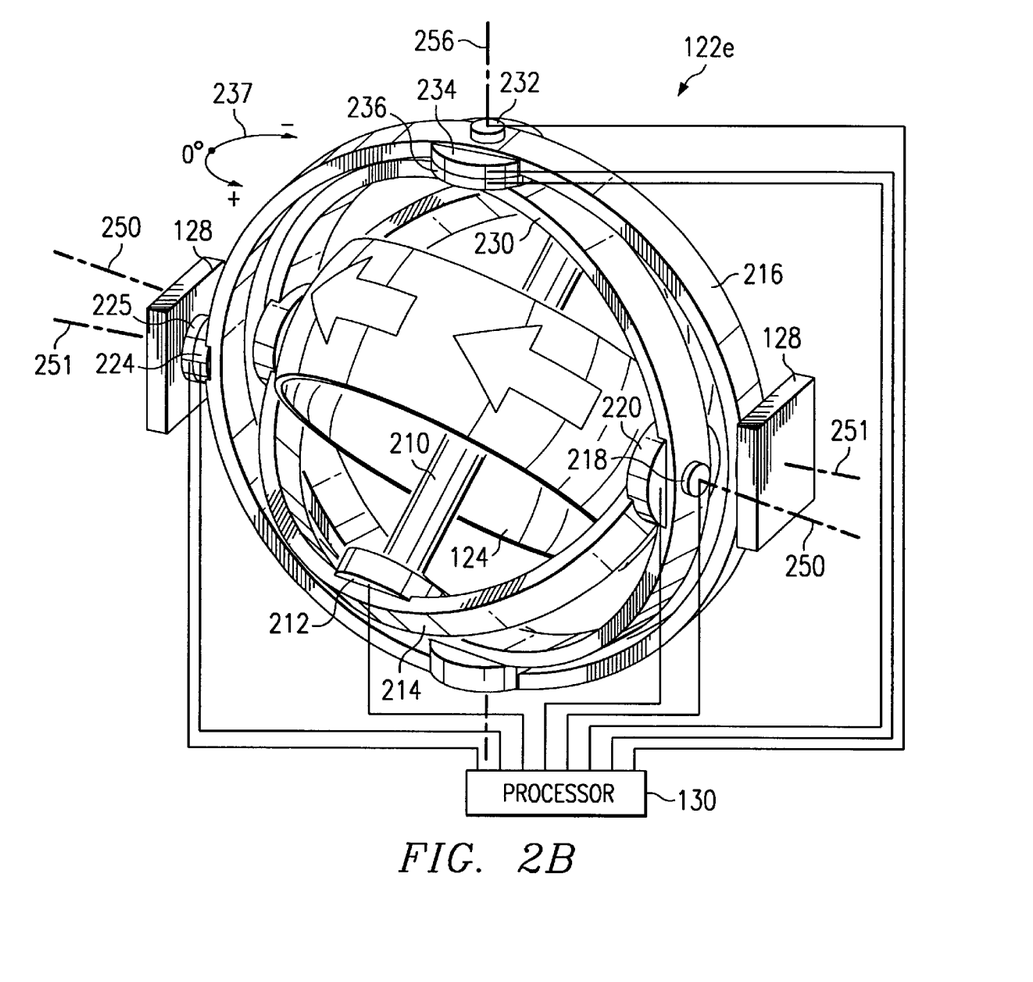
FIG. 2B illustrates one embodiment of a gyroscope with three degrees of freedom that may be used in the system of FIG. 1.

FIG. 2B illustrates one embodiment of a gyroscope 122e with three degrees of freedom that may be used in system 100 of FIG. 1. Gyroscope 122e includes rotor 124, axle 210, motor 212, inner gimbal 214, sensor 220 and motor 218, which are described in connection with FIG. 2A. Gyroscope 122e also includes outer gimbal 216, brake 224, motor 225, and bases 128, which are also described in connection with FIG. 2A.

Gyroscope 122e also includes a middle gimbal 230 coupled to inner gimbal 214 and outer gimbal 216. Middle gimbal 230 rotates within outer gimbal 216 about an axis 256 defined approximately by the points where middle gimbal 230 is coupled to outer gimbal 216. A motor 232 controls the rotation of middle gimbal 230 and may be substantially similar to motor 218. Motor 232 may align gyroscopes 122a and 122b of a pair 120 such that rotor 124 of gyroscope 122a is rotating in a direction approximately opposite to the rotation of rotor 124 of gyroscope 122b. A brake 236 decreases or stops the rotation of middle gimbal 230, and may be substantially similar to brake 224. Other suitable devices for decreasing the rotation of middle gimbal 230, however, may be used, for example, a motor may be used to decrease the rotation.

A sensor 234 detects the position and motion of middle gimbal 230, for example, the angle of rotation of middle gimbal 230 with respect to a plane orthogonal to the plane of outer gimbal 216, where the positive and negative directions are shown by arrows 237. Processor 130 determines the motion of gyroscope 122e through sensors 224, 234 and 220, and controls the motion of gyroscope 122e through motors 212, 218, and 232 and brakes 224 and 236.

Gyroscope 122e may be coupled a similarly constructed gyroscope 122f with three degrees of freedom. Processor 130 controls the motion of gyroscopes to generate a torque about any axis. The generated torque may be used to direct object 110 in any number of directions.

Figure 3A:
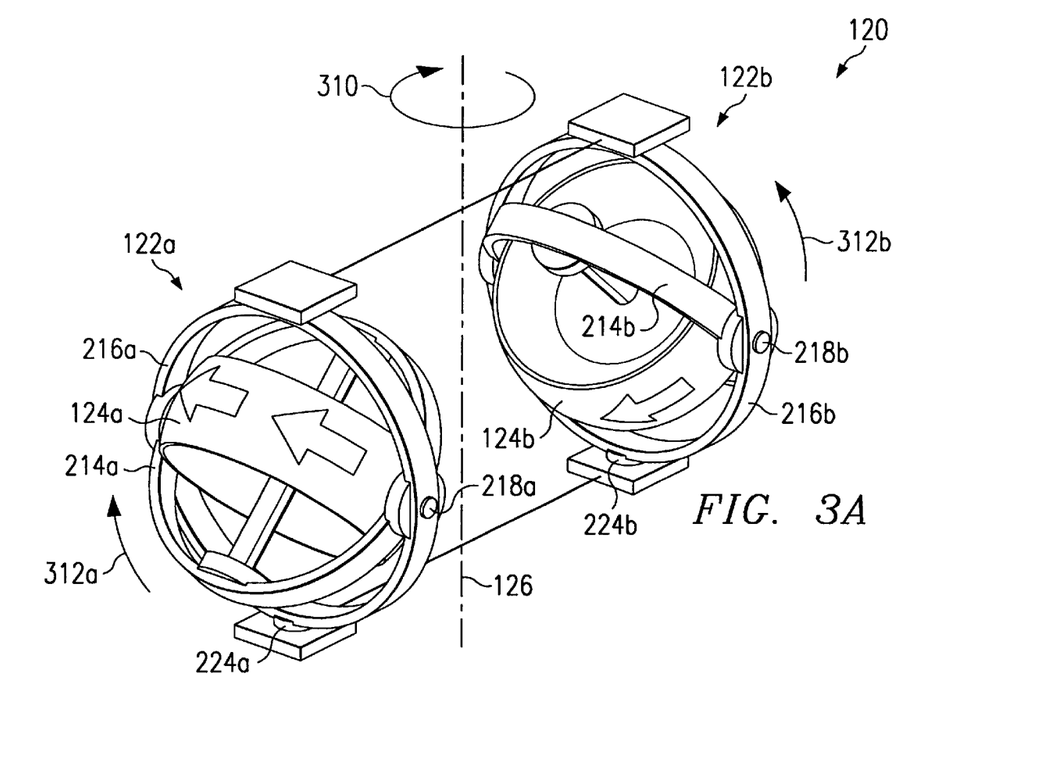
FIGS. 3A through 3E illustrate a pair of gyroscopes operating according to one embodiment of a method for directing an object.
Figure 3B:
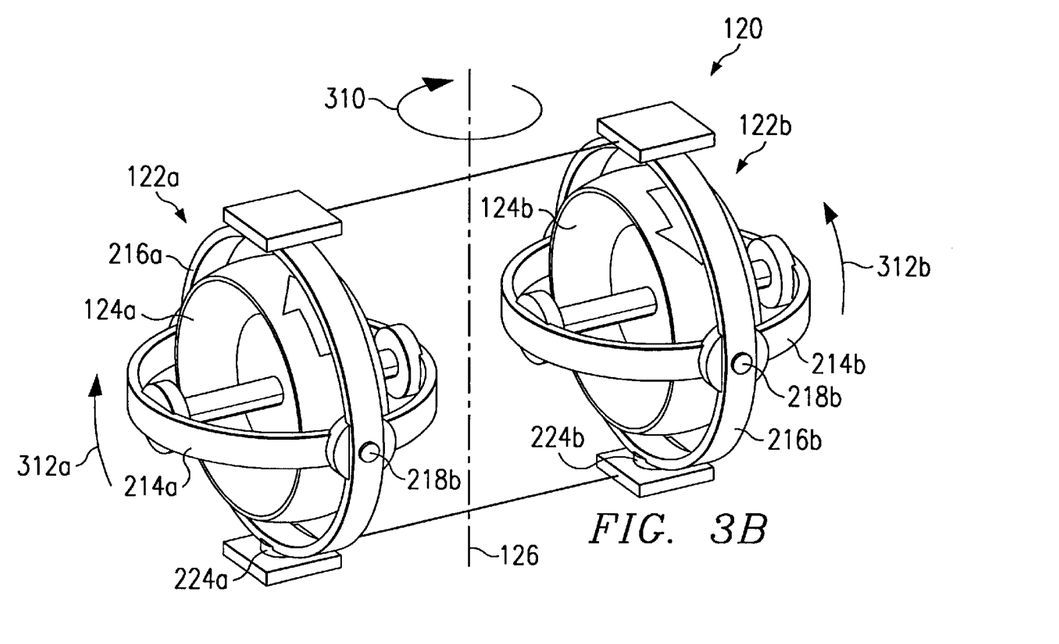
Figure 3C:
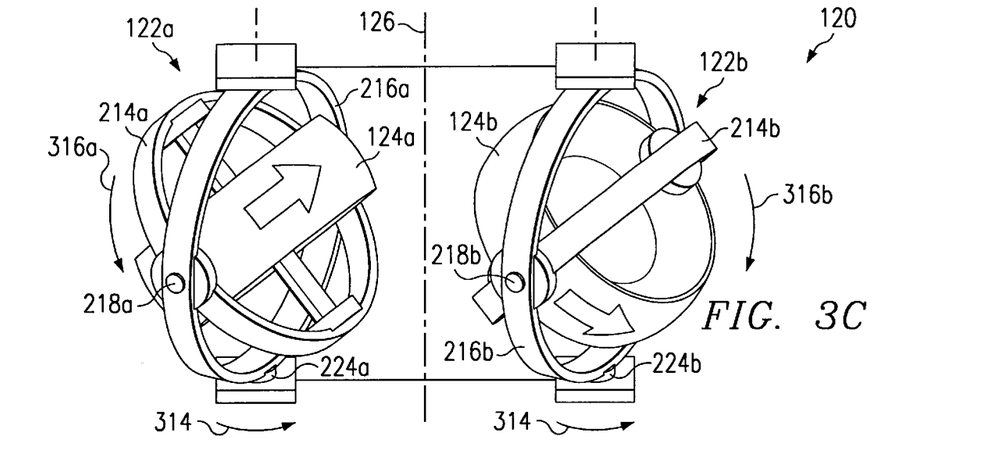
Figure 3D:
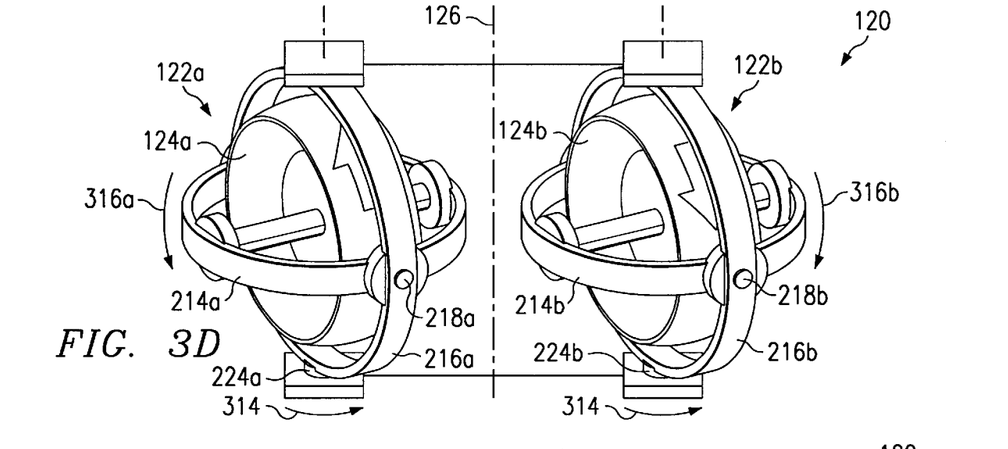
Figure 3E:
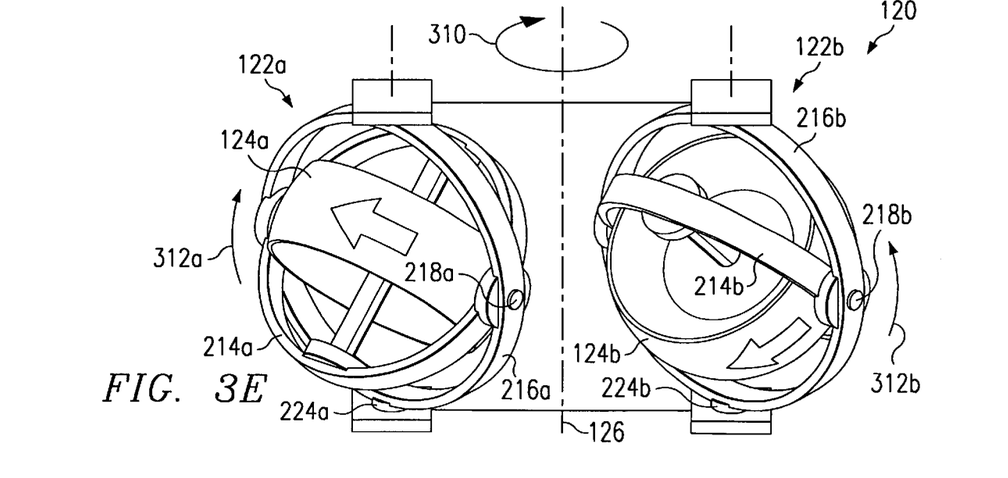
Figure 4:
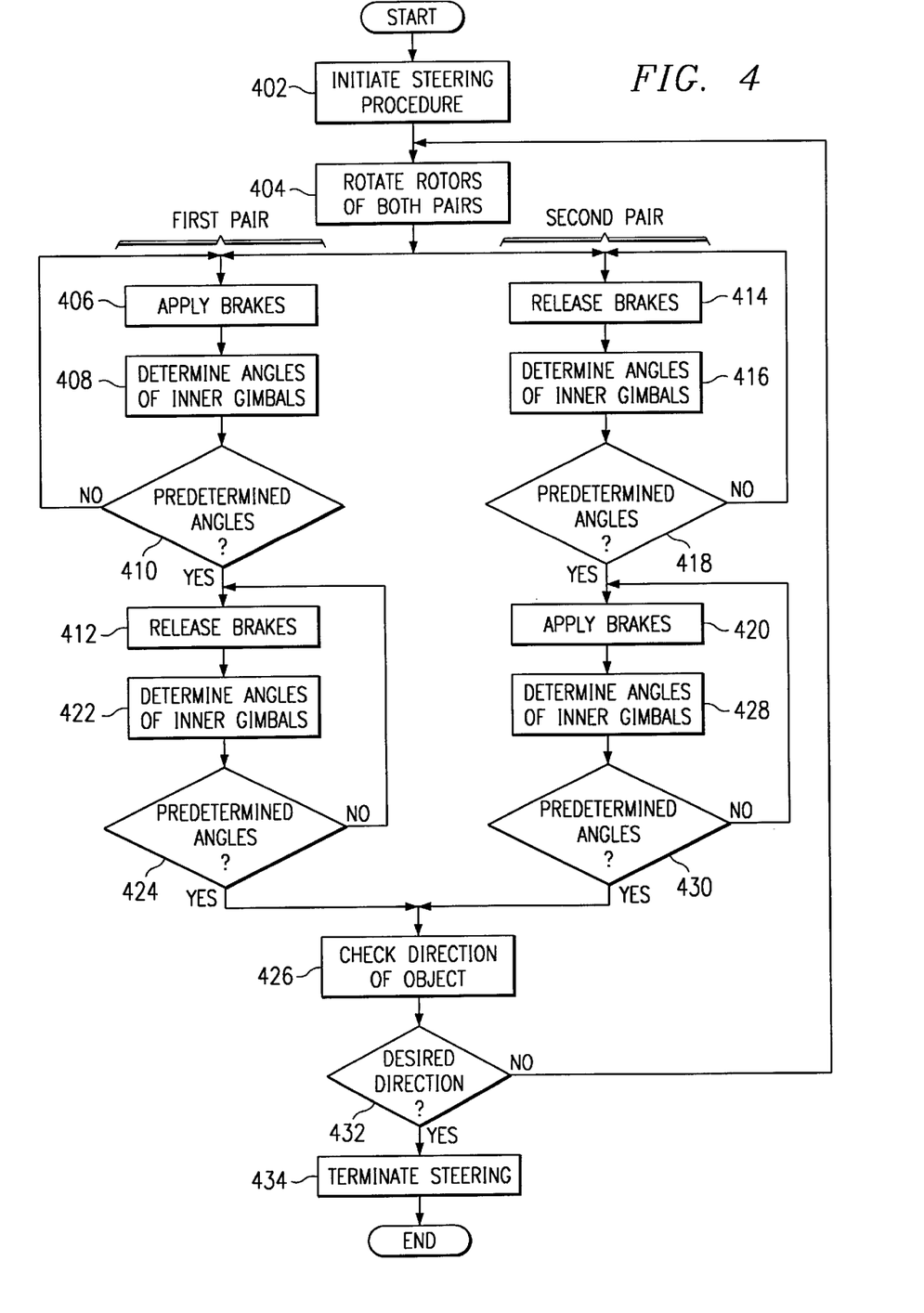
FIG. 4 is a flowchart of one embodiment of a method for directing an object.

FIGS. 3 and 4 illustrate one embodiment of a method for directing object 110. FIGS. 3A through 3E illustrate a pair 120 of gyroscopes 122 with two degrees of freedom operating according to the method. Any suitable gyroscope 122 with at least two degrees of freedom, however, may be used, depending upon the application. FIG. 3A illustrates rotating rotors 124 of gyroscopes 122 in torque mode. Motor 225 may adjust outer gimbals 216 such that rotor 124a rotates in a direction approximately opposite to the rotation of rotor 124b. Brakes 224 are applied to decrease or stop rotation of outer gimbals 216. Additionally, motors 218 are enabled to rotate inner gimbals 214 in the direction indicated by arrows 312. As rotors 124 rotate, a torque 310 is generated about central axis 126.

FIG. 3B illustrates the rotation of gyroscopes 122 about central axis 126 in torque mode. The rotation is caused by torque resulting from the rotation of rotors 124 and inner gimbals 214 and the application of brakes 224. The angles of rotation of inner gimbals 214 are approximately 90° with respect to a 0° plane approximately orthogonal to the plane of outer gimbals 216. As inner gimbals 214 rotate in the positive direction indicated by arrows 312 towards +90°, the torque decreases.

FIG. 3C illustrates inner gimbals 214 at a predetermined angle of rotation between 0° and +90°, for example, approximately +45°. When inner gimbals 214 reach the predetermined angle, the torque has decreased, and processor 130 places gyroscopes 122 in a reset mode. Brakes 224 are released so that outer gimbals 216 are free to rotate in the direction indicated by arrows 314. Motor 218 rotates inner gimbals 214 in the negative direction as indicated by arrows 316. Only friction torque about central axis 126a is generated by gyroscopes 122a and 122b in reset mode.

FIG. 3D illustrates gyroscopes 122 in reset mode when brakes 224 are released. Outer gimbals 216 are free to rotate in direction indicated by arrow 314, inner gimbals 214 continue to rotate in the negative direction indicated by arrow 316 towards −90°, and no torque about central axis 126 is generated.

FIG. 3E illustrates inner gimbals 214 reaching a predetermined angle of rotation between 0° and −90°, for example, approximately −45°. When inner gimbals 214 reach the predetermined angle of rotation, brakes 224 are applied, motor 218 rotates inner gimbals 214 in the positive direction and the gyroscopes 122 return to the torque mode as described in connection with FIG. 3A.

In an alternative embodiment, a brake may be applied to inner gimbal 214 and a motor may rotate outer gimbal 216 in a positive direction to place gyroscope 122 in a torque mode. The brake may be released to allow inner gimbal 214 to rotate and the motor may rotate outer gimbal 216 in a negative direction to place gyroscope 122 in a reset mode.

In an alternative embodiment, a gyroscope 122e of FIG. 2B with three degrees of freedom may be used to direct object 110 about a range of axes. Inner gimbal 214 and middle gimbal 230 may be placed in torque mode to generate a torque about a control axis, and outer gimbal 216 may be used to adjust the control axis. Additionally, middle gimbal 230 and outer gimbal 216 may generate a torque about a control axis and inner gimbal 214 may be used to adjust the control axis.

FIG. 4 is a flowchart illustrating one embodiment of a method for directing an object 110 using gyroscopes with two degrees of freedom. The method directs object 110 by initiating torque generation from a first pair 120a of gyroscopes 122. When torque generated from first pair 120a decreases, the method initiates torque generation from a second pair 120b of gyroscopes 122. The method repeats this process until object 110 is pointing in a desired direction. Although a gyroscope with two degrees of freedom is used to illustrate the method, the method may use any suitable gyroscope with any number of degrees of freedom. Additionally, the steps of the method may be performed in a different order than is illustrated in FIG. 4.

The method begins at step 402, where processor 130 initiates the directing procedure. Processor 130 rotates rotors 124 of both pairs 120 of gyroscopes 122 at step 404, by directing motors 212 to turn rotors 124 about axles 212. The method proceeds to steps 406 and 414, where first pair 120a is placed in a torque mode and second pair 120b is placed in a reset mode, respectively.

At step 406, processor 130 applies brakes 224 of first pair 120a and directs motor 218 to rotate inner gimbals 214 in the positive direction, as illustrated in FIG. 3A, in order to place first pair 120a into torque mode. First pair 120a generates a torque about central axis 126a. The angles of rotation of inner gimbals 214 of first pair 120a are determined at step 408. Sensors 220 detect the angles of rotation of inner gimbals 214 and transmit the information to processor 130. At step 410, processor 130 determines whether the angles of rotation are at predetermined angles between 0° and +90°, for example, approximately +45°. If the angles of rotation are not at the predetermined angles, the method returns to step 406, where processor 130 continues to apply brakes 224 and rotate inner gimbals 214 such that first pair 120a continues to generate torque. As inner gimbals 214 approach the predetermined angles of rotation, the torque generated by first pair 120a decreases. If the angles of rotation are at the predetermined angles, the method proceeds to step 412, which is described below.

At step 414, processor 130 releases brakes 224 of second pair 120b to allow outer gimbals 216 to rotate freely and directs motor 218 to rotate inner gimbals 214 in the negative direction, in order to place second pair 120a in reset mode. When outer gimbals 216 of second pair 120b rotate freely, second pair 120b generates only a friction torque. The angles of rotation of inner gimbals 214 of second pair 120b are determined at step 416. Sensors 220 detect the angles of rotation of inner gimbals 214 and transmit the information processor 130. At step 418, processor determines whether the angles of rotation are at predetermined angles between −90° and 0°, for example, approximately −45°. If the angles of rotation are not at predetermined angles, the method returns to step 414, where outer gimbals 216 continue to rotate freely. If the angles of rotation are at the predetermined angles, the method proceeds to step 420, which is described below.

At step 412, processor 130 releases brakes 224 of first pair 120a to allow outer gimbals 216 to rotate freely and directs motor 218 to rotate inner gimbals in the negative direction, as illustrated in FIG. 3C, which places first pair 120a in reset mode. When outer gimbals 216 rotate freely, first pair 120a does not generate a torque. Processor 130 determines the angles of rotation of inner gimbals 214 at step 422, and determines whether the angles of rotation are at predetermined angles at step 424. If the angles of rotation are not at the predetermined angles, the method returns to step 412, where outer gimbals 216 continue to rotate freely and inner gimbals 214 rotate in the negative direction. If the angles of rotation are at the predetermined angles, the method proceeds to step 426, where processor 130 checks the direction of object 110.

Concurrently, before, or after step 412, where first pair 120a is in reset mode, the method proceeds to step 420, where second pair 120b is placed in torque mode. At step 420, processor 130 applies brakes 224 to outer gimbals of second pair 120b and directs motor 218 to rotate inner gimbals 214 in the positive direction. When brakes 224 are applied, second pair 120b generates a torque. Processor 130 determines the angles of rotation of inner gimbals 214 at step 428, and determines whether the angles of rotation are at the predetermined angles at step 430. If the angles of rotation are not at the predetermined angles, the method returns to step 420, where processor 130 continues to apply brakes 224. If the angles of rotation are at the predetermined angles, the method proceeds to step 426.

At step 426 processor 130 checks the direction of object 110. If object 110 is not pointed in a desired direction at step 432, the method returns to step 404, where rotors 124 of both pairs 120 are rotating. If object 110 is pointing in the desired direction at step 432, the method proceeds to step 432, where processor 130 ends the directing procedure, and the method terminates.

Although an embodiment of the invention and its advantages are described in detail, a person skilled in the art could make various alterations, additions, and omissions without departing from the spirit and scope of the present invention as defined by the appended claims.

What is claimed is:

1. A system for directing an object, the system comprising:
    a first gyroscope comprising a first rotor operable to rotate;
    a second gyroscope substantially rigidly coupled to the first gyroscope and comprising a second rotor operable to rotate, each gyroscope comprising a motor operable to rotate a first gimbal, the first gimbal of the first gyroscope coupled to the first rotor, the first gimbal of the second gyroscope coupled to the second rotor;
    a plurality of brakes, each brake operable to substantially simultaneously decrease the rotation of a second gimbal of each gyroscope, the second gimbal coupled to the first gimbal; and
    a processor coupled to the first gyroscope and the second gyroscope, the processor operable to:
        determine a first position of the first gimbal, the first position describing an angle between a first plane of the first gimbal and a zero degree plane approximately orthogonal to a second plane of the second gimbal, the angle of the first position being in a range of zero degrees and minus ninety degrees;
        direct each brake to decrease the rotation of the second gimbal in response to the first position;
        determine a second position of the first gimbal, the angle of the second position being in a range of zero degrees and plus ninety degrees; and
        release each brake to increase the rotation of the second gimbal in response to the second position;
    the first gyroscope and the second gyroscope operable to generate a torque to direct an object.

2. The system of claim 1, wherein:
    the first gimbal comprises an inner gimbal; and
    the second gimbal comprises an outer gimbal.

3. The system of claim 1, wherein each gyroscope comprises a sensor operable to determine the position of the first gimbal.

4. The system of claim 1, wherein the torque is substantially centered about an axis approximately equidistant from the first gyroscope and the second gyroscope.

5. The system of claim 1, wherein each gyroscope comprises a third gimbal coupled to the second gimbal, the third gimbal operable to rotate.

6. The system of claim 1, wherein the torque is operable to direct an aircraft.

7. A method for directing an object, the method comprising:
    rotating a first rotor of a first gyroscope;
    rotating a second rotor of a second gyroscope substantially rigidly coupled to the first gyroscope;
    rotating a first gimbal of each gyroscope;
    determining a first position of the first gimbal of each gyroscope, the first position describing an angle between a first plane of the first gimbal and a zero degree plane approximately orthogonal to a second plane of a second gimbal, the angle of the first position being in a range of zero degrees and minus ninety degrees;
    decreasing substantially simultaneously the rotation of a second gimbal of each gyroscope in response to a command from a processor and in response to the first position, the second gimbal coupled to the first gimbal;
    generating a torque from the rotation of the first rotor and the second rotor; and
    directing an object using the torque.

8. The method of claim 7, further comprising:
    determining a position of the first gimbal; and
    decreasing the rotation of the second gimbal in response to the position.

9. The method of claim 7, further comprising:
    determining a position of the first gimbal; and
    increasing the rotation of the second gimbal in response to the position.

10. The method of claim 7, wherein:
    the first gimbal comprises an inner gimbal; and
    the second gimbal comprises an outer gimbal.

11. The method of claim 7, wherein the torque is substantially centered about an axis approximately equidistant from the first gyroscope and the second gyroscope.

12. The method of claim 7, further comprising rotating a third gimbal coupled to the second gimbal.

13. The method of claim 7, further comprising directing an aircraft using the generating torque.

14. A system for directing an object, the system comprising:
- a first pair of gyroscopes operable to generate a first torque;
- a second pair of gyroscopes operable to generate a second torque, each gyroscope comprising:
  - a rotor operable to rotate;
  - a motor operable to rotate a first gimbal coupled to the rotor; and
  - a brake, the brakes of each pair of gyroscopes operable to substantially simultaneously decrease the rotation of a pair of second gimbals of the pair of gyroscopes, each second gimbal coupled to the first gimbal; and
- a processor coupled to the first pair of gyroscopes and the second pair of gyroscopes, the processor operable to:
  - determine a state of the first pair of gyroscopes and the second pair of gyroscopes, the state comprising a member selected from a group consisting of a torque mode, a decrease of torque mode, and a reset mode;
  - adjust the first pair of gyroscopes and the second pair of gyroscopes in response to the state by:
    - initiating the torque mode at the second pair of gyroscopes if the state of first pair of gyroscopes comprises the decrease of torque mode; and
    - initiating the reset mode at the second pair of gyroscopes if the state of the first pair of gyroscopes comprises the torque mode, the reset mode preventing the second pair of gyroscopes from generating the second torque; and,
  - direct continuously an object using the first torque and the second torque.

15. The system of claim 14, wherein each pair of gyroscopes comprises a first gyroscope and a second gyroscope coupled to the first gyroscope.

16. The system of claim 15, wherein the first torque is substantially centered about an axis approximately equidistant from the first gyroscope and the second gyroscope of the first pair.

17. The system of claim 16, wherein:
- the first gimbal comprises an inner gimbal; and
- the second gimbal comprises an outer gimbal.

18. The system of claim 16, wherein each gyroscope comprises a sensor operable to determine the position of the first gimbal.

19. The system of claim 16, wherein the processor is operable to:
- determine a position of the first gimbal; and
- direct the brake to decrease the rotation of the second gimbal in response to the position.

20. The system of claim 16, wherein the processor is operable to:
- determine a position of the first gimbal; and
- release the brake to increase the rotation of the second gimbal in response to the position.

21. The system of claim 16, wherein each gyroscope comprises a third gimbal coupled to the second gimbal, the third gimbal operable to rotate.

22. The system of claim 14, wherein each gyroscope comprises:
- a rotor operable to rotate;
- a first motor operable to rotate a first gimbal coupled to the rotor; and
- a second motor operable to decrease the rotation of a second gimbal coupled to the first gimbal.

23. The system of claim 14, wherein the object comprises an aircraft.

24. A method for directing an object, the method comprising:
- generating a first torque using a first pair of gyroscopes;
- generating a second torque using a second pair of gyroscopes, each gyroscope comprising:
  - a rotor operable to rotate;
  - a motor operable to rotate a first gimbal coupled to the rotor; and
  - a brake, each brake of each pair of gyroscopes operable to substantially simultaneously decrease the rotation of a pair of second gimbals of the pair of gyroscopes, each second gimbal coupled to the first gimbal;
- determining a state of the first pair of gyroscopes and the second pair of gyroscopes, the state comprising a member selected from a group consisting of a torque mode, a decrease of torque mode, and a reset mode;
- adjusting the first pair of gyroscopes and the second pair of gyroscopes in response to the state by
  - initiating the torque mode at the second pair of gyroscopes if the state of first pair of gyroscopes comprises the decrease of torque mode; and
  - initiating the reset mode at the second pair of gyroscopes if the state of the first pair of gyroscopes comprises the torque mode, the reset mode preventing the second pair of gyroscopes from generating the second torque; and
- directing continuously an object using the first torque and the second torque.

25. The method of claim 24, wherein each pair of gyroscopes comprises a first gyroscope and a second gyroscope coupled to the first gyroscope.

26. The method of claim 25, wherein the first torque is substantially centered about an axis approximately equidistant from the first gyroscope and the second gyroscope of the first pair.

27. The method of claim 24, wherein each gyroscope comprises:
- a rotor operable to rotate;
- a motor operable to rotate a first gimbal coupled to the rotor; and
- a brake operable to decrease the rotation of a second gimbal coupled to the first gimbal.

28. The method of claim 27, wherein:
- the first gimbal comprises an inner gimbal; and
- the second gimbal comprises an outer gimbal.

29. The method of claim 27, further comprising:
- determining a position of the first gimbal; and
- decreasing the rotation of the second gimbal in response to the position.

30. The method of claim 27, further comprising:
- determining a position of the first gimbal; and
- increasing the rotation of the second gimbal in response to the position.

31. The method of claim 27, wherein each gyroscope comprises a third gimbal coupled to the second gimbal, the third gimbal operable to rotate.

32. The method of claim 24, wherein each gyroscope comprises:
- a rotor operable to rotate;
- a first motor operable to rotate a first gimbal coupled to the rotor; and
- a second motor operable to decrease the rotation of a second gimbal coupled to the first gimbal.

33. The method of claim 24, wherein the object comprises an aircraft.

* * * * *